March 22, 1927.
H. PAPST
1,622,204
MAGNET FRAME FOR ELECTRIC MACHINES WITH SPLIT POLES
Filed May 25 1926
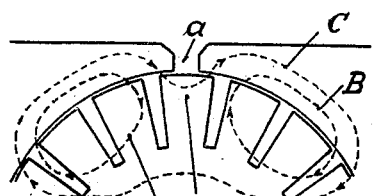
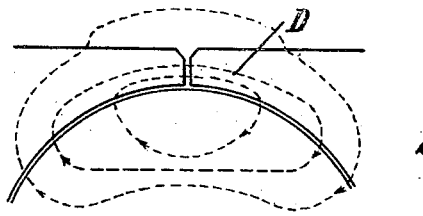
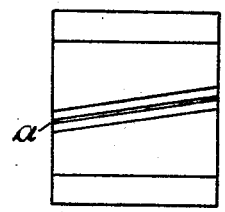
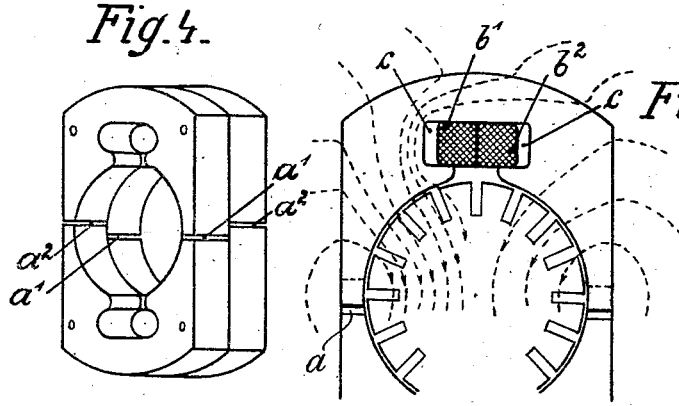
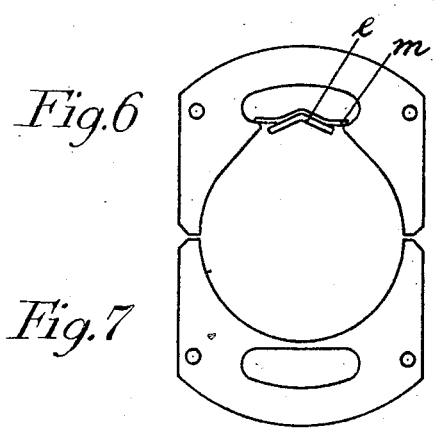
Inventor
Hermann Papst
by Ernest D. Jansen
Atty.

Patented Mar. 22, 1927.

1,622,204

UNITED STATES PATENT OFFICE.

HERMANN PAPST, OF VIENNA, AUSTRIA, ASSIGNOR, BY MESNE ASSIGNMENTS, TO FRANCIS B. KEANE, OF BRIDGEPORT, CONNECTICUT.

MAGNET FRAME FOR ELECTRIC MACHINES WITH SPLIT POLES.

Application filed May 25, 1926, Serial No. 111,587, and in Austria March 18, 1925.

My invention relates to improvements in the magnet frames for electric machines with split poles. Such machines with split or divided poles for reducing the armature field have the inherent drawback that the alternate passage of teeth and spaces below the split pole develops an oscillation of the armature field as well as the exciting field which in turn cause an oscillation of the currents. These oscillations produce faulty commutation and other phenomena. The armature field is dissolved into partial fields which run in opposite directions at both sides of the pole gap and thus produce a magnetic pressure which forces part of the armature field across the head of any tooth passing below the gap. The armature field thus carries out an oscillation the frequency of which is equal to the number of spaces passing below the gap in the unit of time. The oscillation of the field causes furthermore a very powerful and undesired alternating voltage at the brushes. If such machines are carried out with a small pole gap the armature field in the neutral or reversing zone and also in the pole gap becomes relatively strong which influences the commutation unfavorably and also has other disadvantages. If it is attempted to avoid these drawbacks by enlarging the pole gap up to the width of a tooth or even beyond or by making the pole gap non-continuous, it is found that an elimination of the drawbacks is not possible or possible only in such a manner that other and equally serious drawbacks, such as the reduction of the main field, enhanced iron losses and the like are developed.

My invention effectively avoids these disadvantages. I have found that the above stated drawbacks may substantially be eliminated by giving the pole gap a certain size. This size of gap is approximately double that of the main air gap and its results are that then separate fields are no longer developed at both sides of the pole gap but that the armature field is closed across the pole gap, the resistance of the gap being, however, still great enough to prevent a saturation of the iron adjacent to the pole gap by the armature field so that no reduction of the main field takes place. By closing the partial fields into one armature field over the pole gap, I am enabled to eliminate the disadvantages produced by the oppositely directed fluxes of the partial fields forcing the armature field across the tooth passing the pole gap at any given instant. The iron losses, as well as the pulsating of the armature and subsequently of the exciter current, previously present are thereby materially reduced or even eliminated entirely.

A further means for rendering the armature field oscillations harmless consists in disposing the pole gap obliquely or stepping it, that is, forming the gap so that it is not co-extensive with or continuously parallel to the axis of the machine. This results in the sum of the armature fields being constant at any moment.

For the purpose of eliminating the influence of the armature field upon the reversing zone the field coils are furthermore located directly in the said zone whereby the exciter current displaces or blows the armature field away from the said zone.

A further means for eliminating the field oscillations consists in completely closing the opening of the pole clearance which is particularly to be recommended in the case of alternating current machines. In case of a comparatively large pole covering, the course of the field curve in the neutral zone is very steep whereby the normal commutation is rendered very difficult since the extent of the neutral zone is very limited. In order to obtain a flat field curve and thereby broaden the neutral zone a piece of iron is disposed in the pole clearance into which the flux generated by the armature winding will pass and thereby prevent the flux from penetrating into the armature teeth in the neutral zone. The piece of iron is preferably in contact with the air at both pole edges so that it is not saturated by the main field.

In the drawing affixed to my specification and forming part thereof the invention is diagrammatically illustrated by way of example. In the drawings:

Fig. 1 shows the course of the armature field in the usual split pole machine,

Fig. 2 shows a machine embodying my invention with correctly dimensioned gaps,

Fig. 3 shows an oblique pole gap,

Fig. 4 shows a stepped pole gap,

Fig. 5 shows the location of the coils in the neutral zone,

Fig. 6 shows the arrangement of the piece of iron in the pole gap, and Fig. 7 shows the closed pole gap.

Referring to Fig. 1, it will be seen that in the ordinary split pole machines an armature field similar to a pair of spectacles is developed at both sides of the split pole $a$ which is indicated by the curves A and B. The two fields have opposite directions at the pole gap. When a tooth $z$ passes below the gap $a$ the armature field will therefore show the shape indicated by the curve C with a saddle-like cavity within the tooth and will close across the head of the tooth $z$. As tooth and space pass alternately below the gap an oscillation of the armature field of high frequency results. The alternating voltage developed at the brushes amounts to as much as one half and even more of the rotation voltage.

If the gap is suitably proportioned, i. e. has approximately a width equal to double the main air gap, the course of the armature field is similar to the curve D shown in Fig. 2. In this case the armature field will close through the pole gap which however still offers a sufficiently great magnetic reluctance to weaken the armature field and to prevent saturation of the iron surrounding the pole gap so that the magnetic field is not substantially weakened. The advantages of the gap are thereby retained while the above stated drawbacks are avoided.

Fig. 3, shows a gap inclined to the symmetrical plane of the poles which also neutralizes the action of the tooth head oscillations of the magnet field upon the armature winding or supplements and completes the action brought about by the proper dimensioning of the gap.

Fig. 4, shows a two pole frame with stepped gap in which the gaps $a^1$ and $a^2$ in the laminated pole-core of the field magnets are located at different levels.

These two arrangements have the effect that the sum of the partial fields fluctuating in counterphase is constant at any moment.

Fig. 5 illustrates a two pole frame with magnet coils $b^1$, $b^2$ which are in contact in the neutral zone and are located closely above the armature. In the construction shown the flux due to the exciting windings $b^1$ saturates the pole pieces in the neighborhood of the neutral zone and thus forces the flux due to the armature reaction to follow a path of minimum reluctance which does not pass through the neutral zone and hence does not interfere with commutation. Should air passage for ventilation purposes be necessary these are provided at the side at $c$.

Fig. 6 illustrates a two pole frame with a piece of iron $e$ in the pole clearance whereby the armature field is kept away from the armature teeth. The piece of iron $e$ is attached by means of a brass strip $m$ and magnetically separated from the pole edges so that it cannot become saturated by the armature field and so that the same flux distribution exists at the pole clearance as exists at the pole gap.

In Fig. 7 a completely closed pole clearance is shown which is mainly employed in alternating current motors and into which the wires are threaded. This arrangement has the advantage that the commutation is improved in the case of alternating current by mitigating the brush short circuit. If the pole clearance is closed by an inserted iron bridge which facilitates the winding of the wires, this bridge must be so fitted into the pole piece for the purpose of preventing the oscillations of the field that it follows the inner circumference of the pole piece without a step or joint.

All the above described arrangements of split pole machines enable the utilization of the advantages of the pole gap and pole clearance for reducing the weight and the space requirement without taking into the bargain the drawbacks generally associated with the application of the split poles.

It is to be understood that various changes in the arrangement of the apparatus shown in the accompanying drawing may be made within the scope of the appended claims.

I claim as my invention:

1. In a split pole dynamo electric machine having a field and a slotted armature, a plurality of split polar projections having their adjacent portions separated by pole gaps, each of said gaps having a width of substantially twice the width of the air gap separating said armature and field, and having at least a portion thereof disposed at an angle to the axis of said machine, whereby the sum of the partial fields fluctuating in counterphase about each of said gaps is maintained at a constant value, and whereby the armature flux is resolved into a single field surrounding each of said gaps.

2. In a split pole dynamo electric machine having a field and a slotted armature, a plurality of split polar projections having their adjacent portions separated by pole gaps and having end faces transverse to the axis of the armature, each of said gaps having a width of substantially twice the width of the air gaps separating said armature and field, and having portions thereof lying on opposite sides of a plane passing through the axis and perpendicular to the end faces, whereby the sum of the partial fields fluctuating in counter-phase about each of said gaps is maintained at a constant value, and whereby the armature flux is resolved into a single field surrounding each of said gaps.

In testimony whereof I affix my signature.

HERMANN PAPST.